United States Patent
Ellis et al.

(10) Patent No.: US 7,424,163 B1
(45) Date of Patent: Sep. 9, 2008

(54) SYSTEM AND METHOD FOR LOSSLESS IMAGE COMPRESSION

(75) Inventors: Kenneth K. Ellis, Churubusco, IN (US); Richard D. Forkert, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 892 days.

(21) Appl. No.: 10/889,757

(22) Filed: Jul. 13, 2004

(51) Int. Cl.
    *G06K 9/36* (2006.01)
(52) U.S. Cl. .................. 382/244; 382/232; 382/251
(58) Field of Classification Search ................ 382/232, 382/233, 238, 244–247, 251; 341/200; 375/243
    See application file for complete search history.

(56) References Cited

U.S. PATENT DOCUMENTS

| | | | |
|---|---|---|---|
| 5,091,977 A | 2/1992 | Katata et al. | |
| 5,442,458 A | 8/1995 | Rabbani et al. | |
| 5,903,676 A | 5/1999 | Wu et al. | |
| 6,664,913 B1 * | 12/2003 | Craven et al. | 341/200 |
| 6,671,415 B1 | 12/2003 | Lei | |
| 6,785,422 B2 * | 8/2004 | Bossen | 382/232 |

OTHER PUBLICATIONS

Ali Bilgin et al., "Progressive Image Coding Using Trellis Coded Quantization", IEEE, vol. 8, No. 11, Nov. 1999, pp. 1638-1643.

Ziqiang Qian et al., "Improvements to bit-plane based image compression algorithms", Electronics Letters, vol. 34, No. 18, Sep. 1998, pp. 1736-1737.

Ali Bilgin et al., "Three-dimensional image compression with integer wavelet transforms", Applied Optics, vol. 39, No. 11, Apr. 2000, pp. 1799-1814.

Ismail Avcibas et al., "A Progressive Lossless/Near-Lossless Image Compression Algorithm", IEEE, vol. 9, No. 10, Oct. 2002, pp. 312-314.

Pen-Shu Yeh et al., "Application Guide for Universal Source Encoding for Space", NASA, 1993, pp. 1-30.

Philip J. Sementilli et al., "Wavelet TCQ: submission to JPEG-2000", Department of Electrical and Computer Engineering, The University of Arizona, Tucson, AZ 85721.

* cited by examiner

*Primary Examiner*—Duy M Dang
(74) *Attorney, Agent, or Firm*—RatnerPrestia

(57) ABSTRACT

A method of lossless image data compression including the steps of: (a) receiving an image; (b) forming a residual image by differencing adjacent samples of the received image; (c) forming multiple bitplanes directly from the residual image; (d) predicting polarities of data values of the residual image; (e) determining incorrectly predicted polarities and storing the incorrectly predicted polarities in a table; (f) encoding each of the bitplanes and the incorrectly predicted polarities of the table to form a compressed image, and (g) transmitting both the encoded bitplanes and the encoded incorrectly predicted polarities of the table.

30 Claims, 7 Drawing Sheets

SYSTEM AND METHOD FOR LOSSLESS IMAGE COMPRESSION

TECHNICAL FIELD

The present invention relates, in general, to image data compression and, more specifically, to a system and method for lossless image compression and decompression.

BACKGROUND OF THE INVENTION

Lossless compression is a form of compression where an image may be reconstructed without any loss of information. Lossless image compression is required by medical imaging, satellite/aerial imaging, image archiving, preservation of precious art work and documents, or any applications demanding ultra high image fidelity. Furthermore, lossless image coding is a last step of many lossy image compression systems, such as lossless compression of transform coefficients in Discrete Cosine Transform (DCT) coding.

Generally, image compression algorithms implement one or more of the following functions: prediction, decomposition and encoding. A conventional method for implementing image compression is shown in FIG. 10. As shown, method 200 includes receiving image data (step 202), predicting image data (step 204), and subtracting the predicted image data from the received image data to form a residual image (step 205). The residual image is decomposed or transformed (step 206). The decomposed image is then encoded to form a compressed image (steps 208 and 210). The compressed image may then be transmitted to a receiver. The receiver may reverse the process to obtain the original image data.

Prediction of an image is useful in compression, because the range of a difference between the predicted value of a pixel and the actual value of a pixel is usually significantly smaller than the pixel value itself. Only the residual difference needs to be encoded once the predictor is known. There are a variety of prediction methods that may be used. A simple method uses the previous pixel value to predict the current pixel value. Other methods may include using a weighted sum of the pixels within a local area of an image. These are examples of spatial prediction.

A predictor may also include the intensity in another spectral band or the intensity at a previous time. Spectral predictors exploit the fact that while spectral bands contain different information, they are often highly correlated and, therefore, contain redundant information. By confining the redundant information to a single band (the predictor), the dynamic ranges of the remaining bands may be significantly reduced.

Decomposition uses one of a variety of transformations to compactly represent image data. Examples of these are discrete cosine transforms, wavelet spatial transforms, and the Karhunen-Loeve spectral transform. These achieve compression by describing the data as a weighted sum of known basis functions. Since the basis functions are known, only the weights need to be stored. With the right basis functions, the number of weights stored may be much less than the number of pixels in the original image. These transformations may be applied to the residual or directly to the image.

Encoding typically involves looking for repeating patterns of data values, generating a code book containing these patterns, and expressing the data as a list of references to these patterns. Lempel-Ziv (used in gzip and compress) and run length encoding (RLE) are examples.

There are variations and combinations of prediction, decomposition and encoding that have been implemented. One such combination is the JPEG 2000 standard. The JPEG 2000 standard skips the prediction step, decomposes the image with a discrete wavelet transform (DWT), separates the DWT coefficient into bit planes of DWT coefficients, and encodes the resulting bit stream.

Other algorithms that are either lossless or have lossless modes of operation include gzip, compress, USES, FELICS, JPEG-LS, LuraWave, ERIC, and CREW.

One may expect a conventional lossless compression ratio to range between 1.3:1 and 2.8:1 depending on data content. In a survey of literature published in the last five years, no publications have been found that showed significant improvement in compression ratios. This may suggest that there is a "wall" that lossless compression algorithms have been unable to surmount. The top end of the range of performance appears to be a 2.8:1 compression ratio. Many of the algorithms fall within a narrow range that lies between 2:1 and 2.8:1 compression ratios.

Examining improvements in compression rates (measured in bits per pixel), various algorithms have been tested on various image sets. The results for grayscale images are remarkably consistent. The newer algorithms typically improve the compression rate by anywhere from 0.01 to 0.1 bits per pixel (bpp). However, the rms rate variation between images is typically 0.7-0.8 bits per pixel (bpp). Thus, the differences between algorithms are generally insignificant when compared to the image-to-image differences in performance of a single algorithm.

Table 1 below lists the compression rates in bits per pixel of various conventional algorithms. Using a standard Lena image, the JPEG 2000 standard compression algorithm in the lossless mode does improve the compression rate versus the USES standard by 0.32 bits per pixel. This improvement comes at the cost, however, of a much more complicated algorithm that requires much more computing power.

TABLE 1

Compression Rates (bits per pixel) for lossless compression of the Lena image.

| FELICS | PNG | SPh | USES | JPEG-LS | CALICh | SPa | CALICa | JPEG 2000 |
|---|---|---|---|---|---|---|---|---|
| 4.96 | 4.91 | 4.74 | 4.63 | 4.61 | 4.58 | 4.53 | 4.48 | 4.29 |

In addition, the surveyed algorithms do not appear to deal with coherent noise found in uncalibrated image data. Coherent noise manifests itself as stripes in the image and is a consequence of images being generated by detector arrays, in which each element has a different responsive. Calibration removes most of this striping, but in a remote sensing application where data is transmitted from the sensor in a satellite to the ground, calibration is generally applied on the ground. Striping causes discontinuities in the data which, in turn, reduces compression rates. Compression prior to transmission (to maximize the use of the available bandwidth) needs to deal with these discontinuities in order to maximize compression ratios.

Finally, with the exception of JPEG 2000, the algorithms shown in Table 1 do not allow progressive reconstruction as a feature. This feature first reconstructs the most important data, allowing transmission of the data to be interrupted with minimal information loss. This is an important feature for transmitting data over the Internet, for example. As suggested previously, the JPEG 2000 standard achieves this feature at the expense of high complexity and high computational load.

The present invention provides improvements in compression rate, deals with discontinuities in the image data and permits progressive reconstruction of the image without information loss.

SUMMARY OF THE INVENTION

To meet this and other needs, and in view of its purposes, the present invention provides a method of lossless image data compression. The method has the steps of: (a) receiving a matrix of data values, each received data value represented as an n-bit binary number, each n-bit having a significance level; (b) forming a residual matrix of data values from the received matrix of data values, each residual data value represented as an n-bit binary number, each n-bit having a significance level; (c) forming n bitplanes or less bitplanes of bits from the residual matrix of data values, each bitplane having a different bit significance level; (d) predicting a polarity for each residual data value; (e) comparing the predicted polarities of step (d) with polarities of the residual matrix of data values; (f) determining polarities that are incorrectly predicted, based on the comparison in step (e); (g) listing the incorrectly predicted polarities in a table; and (h) encoding (1) each of the bitplanes formed in step (c) and (2) the table of incorrectly predicted polarities to form a compressed image.

Another embodiment of the invention includes a method of lossless image data compression having the steps of: (a) receiving an image; (b) forming a residual image by differencing adjacent samples of the received image; (c) forming multiple bitplanes directly from the residual image; (d) predicting polarities of data values of the residual image; (e) determining incorrectly predicted polarities and storing the incorrectly predicted polarities in a table; and (f) encoding each of the bitplanes and the incorrectly predicted polarities in the table to form a compressed image.

Still another embodiment of the invention includes a method of predicting polarities of data values of a residual image formed by differencing adjacent samples of a received image, the method having the steps of: (a) forming sum and difference values between a data value of the residual image and a data value of an adjacent sample of the received image; (b) differencing the sum and difference values from spatially adjacent multiple data values of the received image to form multiple positive and negative data values; (c) placing the multiple positive and negative data values into different categories based on their respective absolute values; (d) determining a polarity of the smallest absolute value of the positive and negative data values placed into each of the different categories; and (e) predicting a polarity of a data value of the residual image based on each of the polarities determined in step (d).

In yet another embodiment of the invention, a method of lossless image data decompression includes the steps of (a) receiving a compressed image including multiple bitplanes of bits; (b) reformatting the multiple bitplanes of bits to form a bit stream of absolute values of a residual image and a sign error map for the absolute values; (c) predicting sign bits for the absolute values of the residual image; (d) comparing the predicted sign bits of the residual image with corresponding sign bits of the sign error map; (e) modifying the predicted sign bits based on the comparison in step (d) to form residual signs for the residual image; and (f) forming a restored image based on the residual image and the residual signs.

In still another embodiment of the present invention, a method of compressing an image includes the steps of: (a) receiving an image; (b) differencing adjacent pixels to form a residual image having bit data values of positive and negative polarities; (c) forming absolute values for the bit data values of the residual image, (d) predicting polarities of each of the absolute values formed in step (c); (e) comparing the predicted polarities with polarities of bit data values of the residual image; (f) storing incorrectly predicted polarities in a table, based on the comparison in step (e); and (g) compressing the absolute values formed in step (c) and the table stored in step (f).

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures:

FIG. 5 is a pictorial representation of an N by M array of pixels of an input image, used in accordance with an embodiment of the present invention;

FIG. 6 is a pictorial representation of a residual image having an (N−1) by (M−1) array of pixels, used in accordance with an embodiment of the present invention;

FIG. 7 is a pictorial representation of the residual image of FIG. 6, after being appended to a first row and a first column of the input image of FIG. 5, used in accordance with an embodiment of the present invention;

DETAILED DESCRIPTION OF THE INVENTION

As will be described, the present invention provides a system and method for lossless image data compression. The present invention improves the compression in at least four ways. First, the image data predictor of the invention is improved, which reduces the entropy of the residual image. Second, the invention predicts the sign of a pixel in the residual image. This permits a more compact representation of the residual image. Third, the present invention provides an encoding algorithm that further compacts the residual representation. Fourth, the present invention partitions the residual image into multiple bit planes. Entropy encoding is applied to the bit planes of the residual image, rather than to the residual image itself. This improves the performance of the encoder and permits progressive reconstruction of the data.

Figure 1:
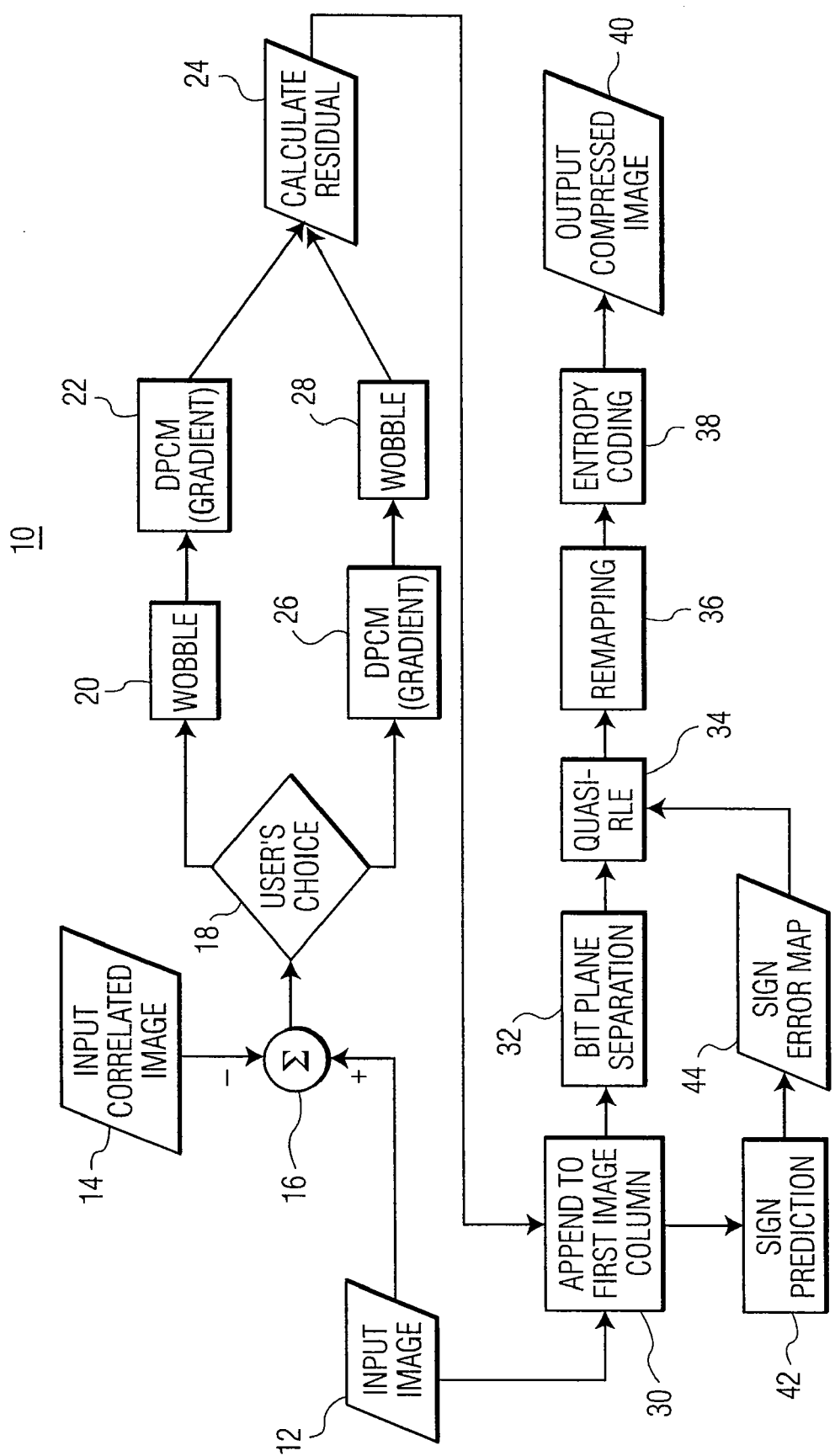
FIG. 1 is a flow diagram of a method for lossless image data compression, in accordance with an embodiment of the present invention.

Referring to FIG. 1, there is shown an exemplary method of the present invention, generally designated as 10. As shown, method 10 includes the following steps, among other steps: receiving an input image (step 12), receiving a correlated image, if available (step 14), and differencing these two received images (step 16).

It will be appreciated that the received correlated image may be an image having a spectral band which is similar to the spectral band of the received input image (for example). Differencing these two received images may achieve a higher compression than only using the input image of step 12. Of course, the steps of receiving the correlated image (step 14) and differencing the two images (step 16) may be turned off. If steps 14 and 16 are turned off, then the input image (also referred to herein as the received image) is provided directly to decision box 18, in which a user may select the top path (steps 20 and 22) or the lower path (steps 26 and 28). The user may specify that the wobble should follow the one-dimensional differential pulse code modulation (DPCM), instead of preceding it.

Wobbling is a reformatting step that reorders as many consecutive data samples as possible from compact objects in a scene. This reduces the spread of the residual and lowers its entropy, since consecutive samples are more likely to come from the same object in the scene.

Figures 2, 3:
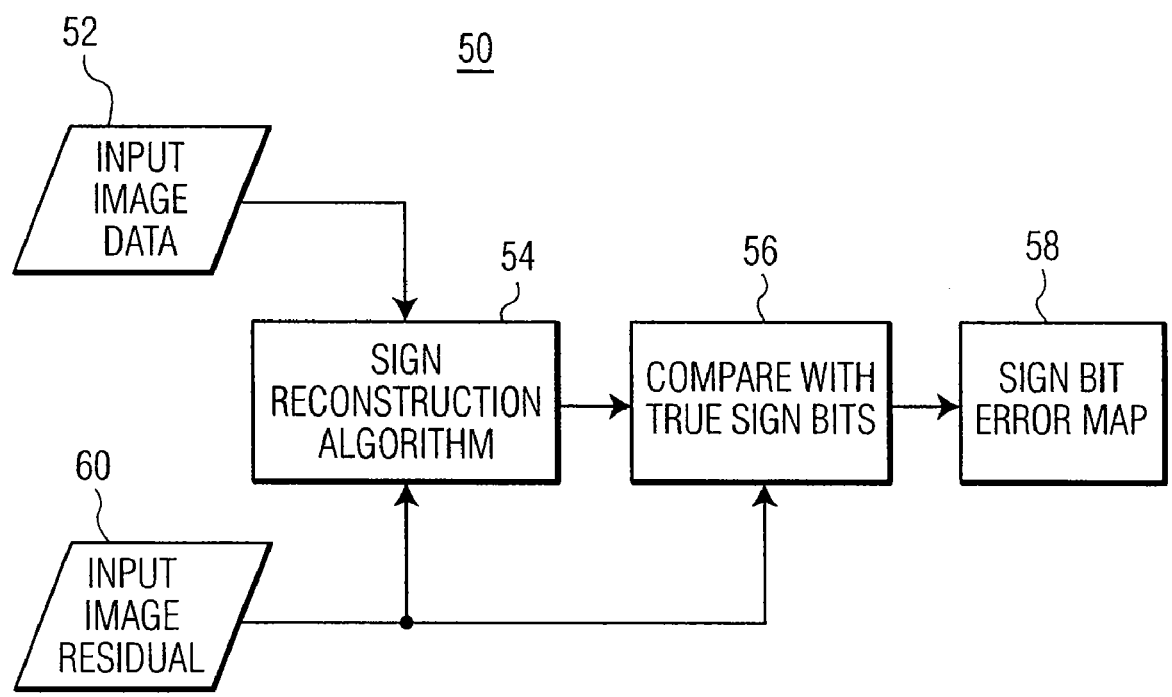
FIG. 2 is a pictorial representation of pixels of an image that are wobbled, or sequentially reordered, in accordance with an embodiment of the present invention.
FIG. 3 is a flow diagram of a method for sign prediction and sign error mapping implemented in the lossless image data compression method of FIG. 1, in accordance with an embodiment of the present invention.

An exemplary implementation of a wobble is illustrated in FIG. 2. Many other implementations may also be used, as would be obvious to one skilled in the art. As shown in FIG. 2, the data samples are temporally reordered. The reordering of the data samples (pixels, for example) is performed on a 7×4 image. Each pixel is assigned a number from left to right, top to bottom. The pixel values are reordered from 1, 2, 3, . . . 8, 9, 10, . . . to 1, 8, 9, 2, 3, 10, 11, 4 . . . , following the overlaid path, rather than the usual row-by-row order.

It will be understood that the wobbling step (step 20 or step 28 in FIG. 1) may preferably be placed after the residual image is obtained (step 24), if a substantial amount of scan-striping is present in the received image.

The DPCM step (step 22 or step 26) includes differencing adjacent data samples of the received image (In order to avoid confusion in the following description, it is assumed herein that the received image is provided by step 12 directly into decision box 18 and that a correlated image is not inputted by step 14). The DPCM step may be applied in the direction of any striping existing in the data, so that the compressing ratio may be maximized.

The residual image is obtained, in step 24, as shown in FIG. 1, after performing the sequence of wobbling and DPCM, or in reverse, the sequence of DPCM and wobbling.

The output of the DPCM step is the residual image, which may have data values greater than and less than zero. Sign bits are required in the compressed data stream that are generally considered to be unpredictable. The present invention predicts the sign bits of the DPCM residual image and provides an error map associated with the sign prediction. The sign prediction is not perfect, but over 75% of the bits may be correctly predicted. A map of the incorrectly predicted bits is sent along with the other data. The sign prediction step and the formation of the sign error map are shown as steps 42 and 44, respectively. These will be described in greater detail later with reference to FIGS. 3 and 4.

Continuing the description of FIG. 1, the residual image obtained in step 24 is appended to the first column and first row of the received image inputted in step 12. This appending step, generally designated as 30, will be described in greater detail later with reference to FIGS. 5, 6 and 7.

The appended residual image, formed in step 30, is bit plane separated in step 32. It will be appreciated that the present invention separates the appended residual image into bit planes. This is very different from having coefficients characterizing data separated into bit planes.

In general, the most significant bit planes of an image are sparse and compress dramatically. There is an advantage, therefore, to compressing each bit plane separately, and saving a fraction of a bit per pixel in the compressed data. Compressing bit planes of the image directly permits progressive reconstruction. This is a significant benefit, since users may interrupt the data transmission when the image quality is sufficient for their purposes. Also, by receiving the image data with the most significant bit information first, the transmission may be more robust against disruption. It will be appreciated that, generally, lossless progressive algorithms do not compress as well as non-progressive algorithms. The present invention provides an alternative that is an exception to this generalization.

As explained later with respect to FIG. 8, N-bit planes may be formed from the received image data, where each received image data value, or pixel value, has an N-bit significance level. As an example, 8-bit planes may be formed when the value of each pixel consists of 8-bits.

Still continuing the description of FIG. 1, the quasi-run-length-encoding (RLE) performed by step 34 encodes a bit stream formed by the bit planes and the sign error map. The bit stream is divided into sets of 7 consecutive bits that are then converted into 8-bit integers. The resulting data stream is searched for runs of zeros, and each run of zeros is replaced with a single integer equal to the number of 8-bit integers that have a value of zero. The first bit of the integer holding this count value is then set to designate it as a zero-run count, instead of a string of 7-bits. Quasi-RLE is discussed in greater detail below.

The method next enters step 36 and performs remapping of the quasi-RLE data stream. The present invention uses a remapping technique that is more efficient than a conventional remapping (as implemented by USES). The invention forces a histogram of remapped sample values to be monotonically decreasing with increasing remapped sample values, and eliminates table entries for which there are no data values. Performance is improved because the remapping adapts to the data content, instead of assuming that the residual image follows a predetermined distribution.

The residual value that occurs most often is mapped to a value of zero, the second most probable value is mapped to 1, etc. The remapping does not change the entropy of the data, but it does permit the following step of entropy coding (step 38) to encode the data with an average number of bits per pixel equal to the entropy.

Next, step 38 of the compression method, as shown in FIG. 1, applies Rice entropy coding to the data stream. This is a conventional coding method and is not described in greater detail.

The last step (step 40) of method 10 outputs the compressed image. The compressed image may be transmitted over a wired or wireless network, or any data bus to a receiver. The receiver may reverse the process to perform decompression and decoding of the transmitted compressed image.

Figures 5, 6, 7:
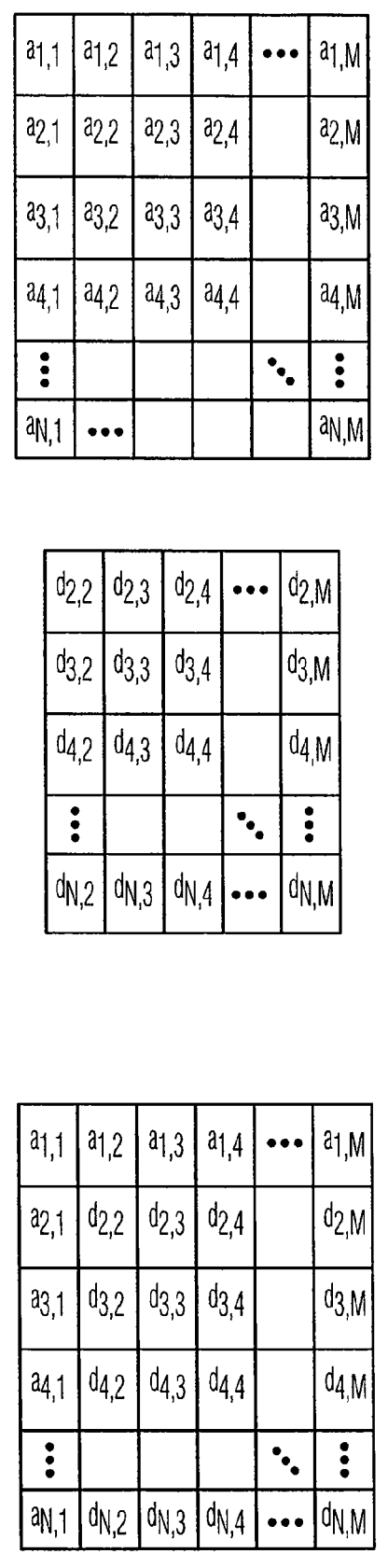

Referring next to FIGS. 5, 6 and 7, step 30 of FIG. 1, which appends the residual image to the first column and first row of the received image, will now be discussed. The data inputted into the residual calculation (step 24 of FIG. 1) is an N×M array or an N×M matrix of data values, as shown in FIG. 5. Each data value, for example $a_{1,1}$, may be represented by 8-bits.

The residual output is shown in FIG. 6. As shown, the residual output is an (N−1)×(M−1) array, or matrix of data values, where $d_{i,j}=|a_{i,j}-a_{i-1,j}|$ and | . . . | denotes the absolute value. Some of the originally received image data, however, is needed for sign prediction and image reconstruction.

The absolute values of the residual matrix are appended to the originally received image data to produce an N×M matrix of data values, as shown in FIG. 7. It will be appreciated that the matrix shown in FIG. 7 is provided as an input data stream to the bit plane separation of step 32 in FIG. 1 and the sign prediction of step 42 in FIG. 1.

Figure 4:
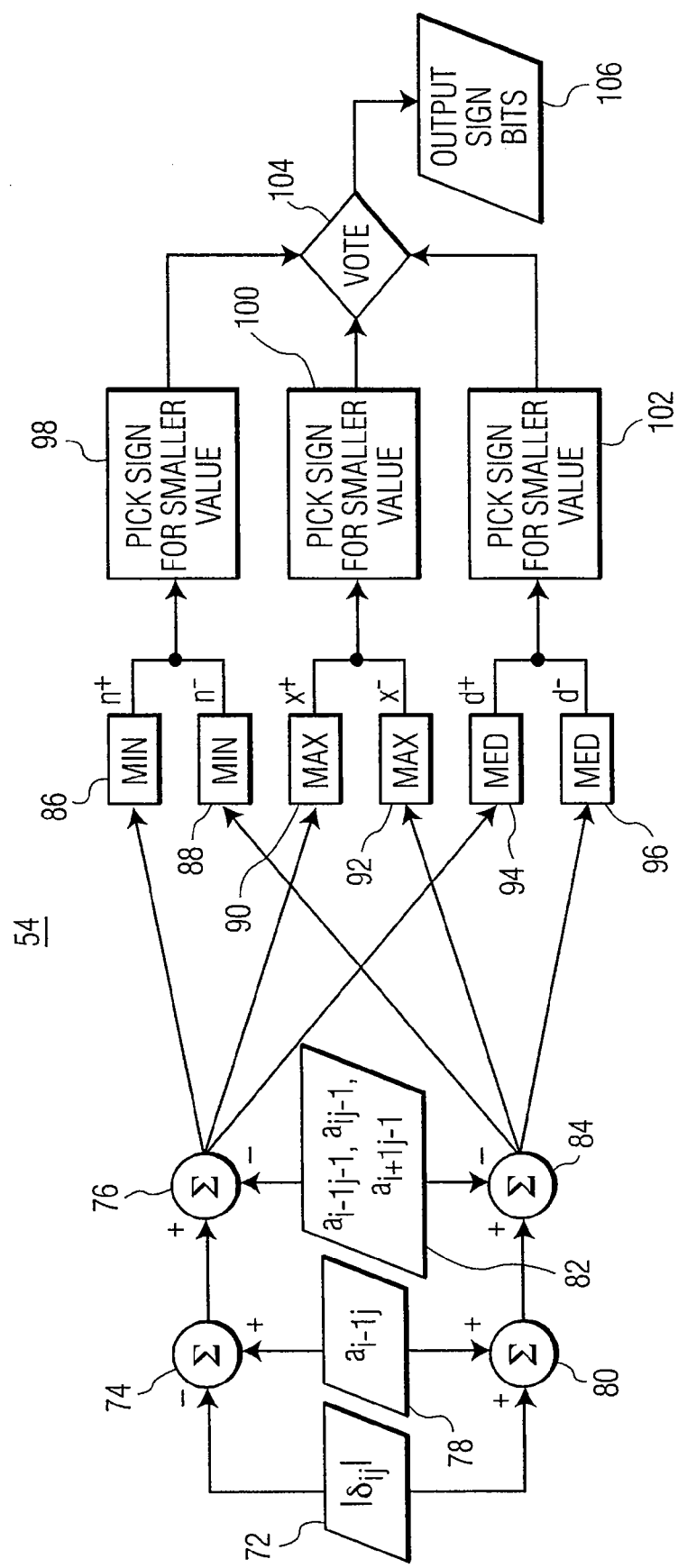
FIG. 4 is a flow diagram of a sign reconstruction algorithm implemented in the lossless image data compression method of FIG. 1, in accordance with an embodiment of the present invention.

Referring next to FIGS. 3 and 4, sign prediction and sign error mapping (steps 42 and 44 of FIG. 1) will now be described. An exemplary method for sign prediction and sign error mapping, generally designated as 50, is shown in FIG. 3. As shown, a residual image (obtained in step 24 of FIG. 1) and the inputted received image (obtained in step 12 of FIG. 1) are also shown in steps 52 and 60 of FIG. 3. Both images are provided to the sign reconstruction algorithm (step 54), which is shown in greater detail in FIG. 4. The sign reconstruction algorithm predicts whether each absolute data value in the matrix of data values of the residual image is positive or negative.

Each data value of the received image is always zero or positive. Each data value of the residual image, however, may be positive or negative, since the residual image is the difference between data values of adjacent samples in the received image, as defined previously. The sign reconstruction algorithm (step 54) predicts the sign of each data value of the residual image.

After predicting the sign bits of each data value, sign reconstruction step 54 provides a data stream of predicted sign bits as an output. Step 56 then compares the predicted sign bits, as output from the sign reconstruction step, with the true sign bits of the residual image, received from step 60. Errors found in the comparison, performed by step 56, are then stored in a sign bit error map in step 58. The sign bit error map (also shown as step 44 in FIG. 1) is then quasi-RLE encoded by step 34 of FIG. 1.

Referring to FIG. 4, the sign reconstruction starts in step 72 with the absolute value of each data sample in the residual image. The absolute value of each data sample, or pixel, in the matrix is denoted as $|\delta_{i,j}|$ which is equal to $d_{i,j}$ (defined previously). This absolute value is added to the value of an adjacent pixel of the received image, at position (i−1,j) by summation step 80, and subtracted from the same value of the received image at position (i−1,j) by summation step 74. The adjacent pixel of the received image at position (i−1,j) is shown received in step 78, and is denoted as $(a_{i-1,j})$. The resulting values from summation and differencing steps 74 and 80 are provided to differencing steps 76 and 84.

The resulting sum value (step 80) and resulting difference value (step 74) are each differenced by steps 84 and 76, respectively, from three other adjacent pixel values of the received image. These three adjacent pixel values are shown received by step 82, as pixel values $(a_{i-1,j-1})$, $(a_{i,j-1})$, and $(a_{i+1,j-1})$. Accordingly, as shown, the output of differencing step 76 is three values and the output of differencing step 84 is three other values.

These six values are categorized into two minimum values (steps 86 and 88), two maximum values (steps 90 and 92) and two intermediate values (steps 94 and 96). The polarity value is a binary symbol that represents the polarity of the data. The symbol "+" represents a zero or positive polarity of data, and the symbol "−" represents a negative polarity of the data.

Step 98 selects the sign bit (positive or negative) of the smaller absolute value in the minimum value category. Similarly, step 100 selects the sign bit of the smaller absolute value in the maximum value category. Finally, step 102 selects the sign bit of the smaller absolute value in the intermediate value category.

A vote is performed by step 104 and the sign bit appearing as the majority (2 out of 3) is output in step 106 as the predicted sign bit for $(\delta_{i,j})$ of the residual image.

The sign prediction of the present invention is not perfect, but over 75% of the bits are correctly predicted. A map of the incorrectly predicted bits is sent with the other data. Its entropy has repeatedly been found to be 0.75 or less, compared to the 1 bit entropy of the sign bits. This results in a saving of 0.25 bits per pixel.

Bit plane separation will now be discussed with reference to FIG. 8. Compressing bit planes is not new, but conventionally has only been applied to coefficients that characterize the data and not the data itself. The most significant bit planes of a data set are sparse and compress dramatically. There is an advantage provided by the invention in compressing each bit plane separately, saving a fraction of a bit per pixel in the compressed data. It also allows the resulting bit planes to be processed in a progressive reconstruction algorithm. This may be a significant benefit, since users may interrupt the data transmission when the image quality is sufficient for their purposes. Also, by receiving the data with the most information first, the transmission may be more robust against disruption.

Figure 8:
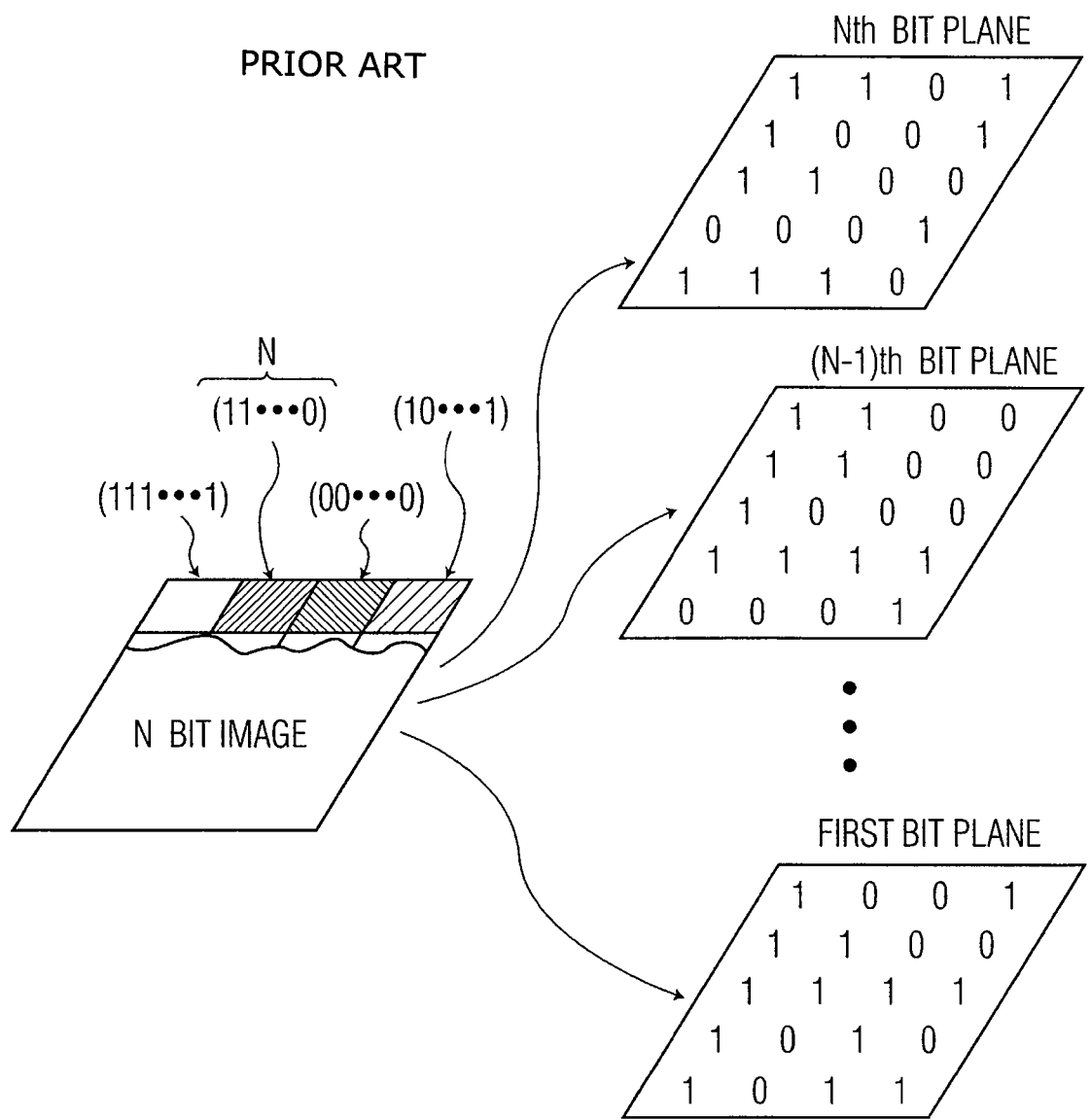
FIG. 8 is a pictorial representation of an N-bit image being separated into different bit planes (for example N bit planes), used in accordance with an embodiment of the present invention.

FIG. 8 depicts an n-bit image (in the embodiment of the present invention, shown in FIG. 1, the n-bit image is the residual image formed in step 24 and appended to the first column and first row of the received image in step 30). Each pixel of the image is represented by an n-bit binary number, where each n-bit has a significance level. The digital image contains M×N pixels each having a pixel value $a_{i,j}$, where i and j are the coordinates of the pixel and where the value is represented by an equivalent n-bit binary number, for example, 10011001 (8-bits), extending from the most significant bit to the least significant bit.

One may form an M×N matrix using only the most significant bits, then that image is a bit plane image representing the most significant bits. If the same operation is performed on the last (least significant) bits of each of the n-bits, then that image is a bit plane image representing the least significant bits. With an n number of bits, an n number of bit planes may thus be formed. In this way, the original image may be decomposed into a set of n M×N bit planes, numbered 1 for the least significant bit (LSB) bit plane through n for the most significant bit (MSB) bit plane. Bit planes offer a reversible decomposition that may be exploited in a lossless compression scheme by encoding each bit plane using a lossless binary compression technique.

Accordingly, FIG. 8 depicts the n-bit image decomposed into n-bit planes. As shown, the first bit plane is the least significant bit and the n-th bit plane is the most significant bit.

Each bit plane is then quasi-RLE encoded in step 34 of FIG. 1. The output of this quasi-RLE often has greater entropy than the input data. However, the Rice entropy coder of step 38 compresses this output more than it would compress the original input data. The reason for this is not known, but it seems to work.

Quasi-RLE will now be described. It will be understood that quasi-RLE may be applied to any series of bits, regardless of how they are obtained. Like other RLE methods, it works best if the input bit stream has been pre-processed in such a way that there are long runs of bits that are set to zero. The steps of the compression algorithm prior to quasi-RLE are intended to do just that.

Quasi-RLE processes the individual bits in the bit stream, regardless of whether they represent a bit-plane, a re-ordered bit plane, or n-bit data values. To illustrate the algorithm, consider the following bit stream:

1100110100011100000000000000000000000010100101 10101100000000000000000

Quasi-RLE first divides the stream into chunks of 7 bits:

1100110 1000111 0000000 0000000 0000000 0000101 0010110 1011000 0000000 0000000

These chunks are converted to an 8-bit integer by using them as the 7 LSBs and setting the MSB to zero. Thus, the example above becomes:

102 71 0 0 0 5 22 88 0 0

Next, the runs of integers with values of zero are counted. Runs with lengths greater than 127 are broken up into chunks of 127 or less. The runs of zeros are replaced with the count, so the example becomes:

102 71 3 5 22 88 2 and the MSB of the resulting integer is set to 'one' to indicate that the integer should be interpreted by a decompression receiver as a count of zero chunks, and not as a string of bits. Accordingly, the example becomes:

102 71 131 5 22 88 130

It may be seen that the integers representing strings of bits are all below 128 and that integers representing runs of zeros are 128 and above. In this example, the quasi-RLE uses 56 bits to represent the original string of 70 bits. The efficiency of this method depends on how many runs of zeros appear in the bit stream.

A variant of this technique that may have an improved performance, in some cases, is to break up the bit stream into unequal sized chunks, where all the chunks containing 'ones' are 7 bits long, and runs of zeros longer than 7 are a single chunk, as follows:

1100110 1000111 00000000000000000000000 1010010 1101011 00000000000000000

The first 14 bits are coded as before. The next 25 bits are all zero, so these are encoded as a run of 25. The next 7 bits contain some ones, so they are converted into an integer value to produce:

102 71 25 82 107 17

Setting the MSB of the zero-run integers to 'one' gives:

102 71 153 82 107 145 which encodes the original 70 bits as 48 bits. The efficiency of the quasi-RLE depends on how many runs of zeros appear in the bit stream.

After performing the quasi-RLE, the method performs remapping in step 36 of FIG. 1. The remapping operation is discussed below by providing an example.

Suppose the residual image consists of a stream of the following numbers:

1 2 2 2 4 2 4 4 0 0

A table of the number of times each data value appears in the data stream is as follows:

| Sample Value | Number of samples | Huffman code length | Encoded data length |
| --- | --- | --- | --- |
| 0 | 2 | 1 | 2 |
| 1 | 1 | 2 | 2 |
| 2 | 4 | 3 | 12 |
| 3 | 0 | 4 | 0 |
| 4 | 3 | 5 | 15 |
| | | | Total = 31 bits |

Entropy coding (step 38) uses the smallest Huffman code length for the smallest sample value and the longest Huffman code length for the largest sample value. In order to obtain the best compression, it is desirable to have the smallest value also be the one that shows up most often. Remapping changes the data values so that the number of samples decreases monotonically, as the remapped sample value increases. This minimizes the sum of Huffman code lengths and maximizes the entropy coding performance. For the example above, the invention replaces all samples having a value of 2 with a value of 0, since 2 is the value that appears most often. The remapping for this example is:

| Original value | Remapped value |
| --- | --- |
| 0 | 2 |
| 1 | 3 |
| 2 | 0 |
| 3 | 4 |
| 4 | 1 |

The following table of the remapped sample values, shows that the number of samples is now monotonically decreasing:

| Sample Value | Number of samples | Huffman code length | Encoded data length |
| --- | --- | --- | --- |
| 0 | 4 | 1 | 4 |
| 1 | 3 | 2 | 6 |
| 2 | 2 | 3 | 6 |
| 3 | 1 | 4 | 4 |
| 4 | 0 | 5 | 0 |
| | | | Total = 20 bits |

The table of original vs. remapped sample values is sent along with the remapped samples in order to reconstruct the original data at the receiving end. This slightly increases the number of bits sent, but this increase is more than offset by the more efficient Huffman coding. If a data set does not need remapping, a special code to indicate "no remapping" may be sent in place of this table to reduce the size of the compressed stream.

Recalling the previous discussion on spectral differencing (steps 14 and 16 of FIG. 1), it will be appreciated that this differencing may be added to method 10 when two correlated data sets need to be compressed. For multispectral imagery, spectral differencing subtracts the images from two channels within a correlated spectral band (e.g. 0.4-2.5 µm, 3.5-5 µm, 5-8 µm, or 8-12 µm bands). This results in a residual similar in character to the DPCM (spatial) residual, with slightly larger spread. By itself it is not as effective as DPCM, since the spectral correlation is likely not as high as the spatial correlation in the data. However, it does a good job of smoothing out intensity variations in homogeneous regions, so that when followed by a one dimensional DPCM the entropy is reduced relative to DPCM alone.

Spectral differencing requires that one of the image channels be compressed using spatial operations only. The difference between that channel and other correlated channels may then be compressed at the improved rate. The more correlated data sets there are, the better the compression gain.

Table 2 compares the compression rates (bits per pixel) of several algorithms when applied to a Lena image. Lena is a standard image used by the image processing community for evaluating image processing algorithms. The present invention outperforms all other algorithms except for the JPEG2000 standard, which has a 0.02 bits per pixel advantage. However, this invention is significantly less complex than the JPEG2000 standard.

signs of the residual image. Having the residual absolute value in step 162 and the corrected residual signs in step 170, these may then be multiplied together in step 172, thereby forming a residual image with the correct positive and negative values.

Decision box 174 reads a flag that has been received with the compressed image. This flag indicates whether the compressed image was first wobbled and then DPCM coded, or whether the compressed image was first DPCM coded and then wobbled. Depending on the choice flag, decision box 174 branches to perform a reverse wobble (step 176) and then a cumulative sum (step 180), or it branches to perform first the cumulative sum (step 178) and then, the reverse wobble (step 182). Either steps 176 and 180, or steps 178 and 182 form an output image.

Step 186 performs a summation between the output image and a correlated image (received in step 184). Finally, step 188 outputs the restored image.

As discussed with respect to the compression method of FIG. 1, the choice flag decision box of step 174 may be eliminated, when the sequence order between wobbling and DPCM is not changed during the construction of the compressed image. Furthermore, steps 184 and 186 may be eliminated if a correlated image is not received.

TABLE 2

Compression Rates (bits per pixel) for lossless compression of the Lena image.

| Algorithm | FELICS | PNG | SPh | USES | JPEG-LS | CALICh | SPa | CALICa | This invention | JPEG 2000 |
|---|---|---|---|---|---|---|---|---|---|---|
| Compression Rate | 4.96 | 4.91 | 4.74 | 4.63 | 4.61 | 4.58 | 4.53 | 4.48 | 4.31 | 4.29 |

Figure 9:
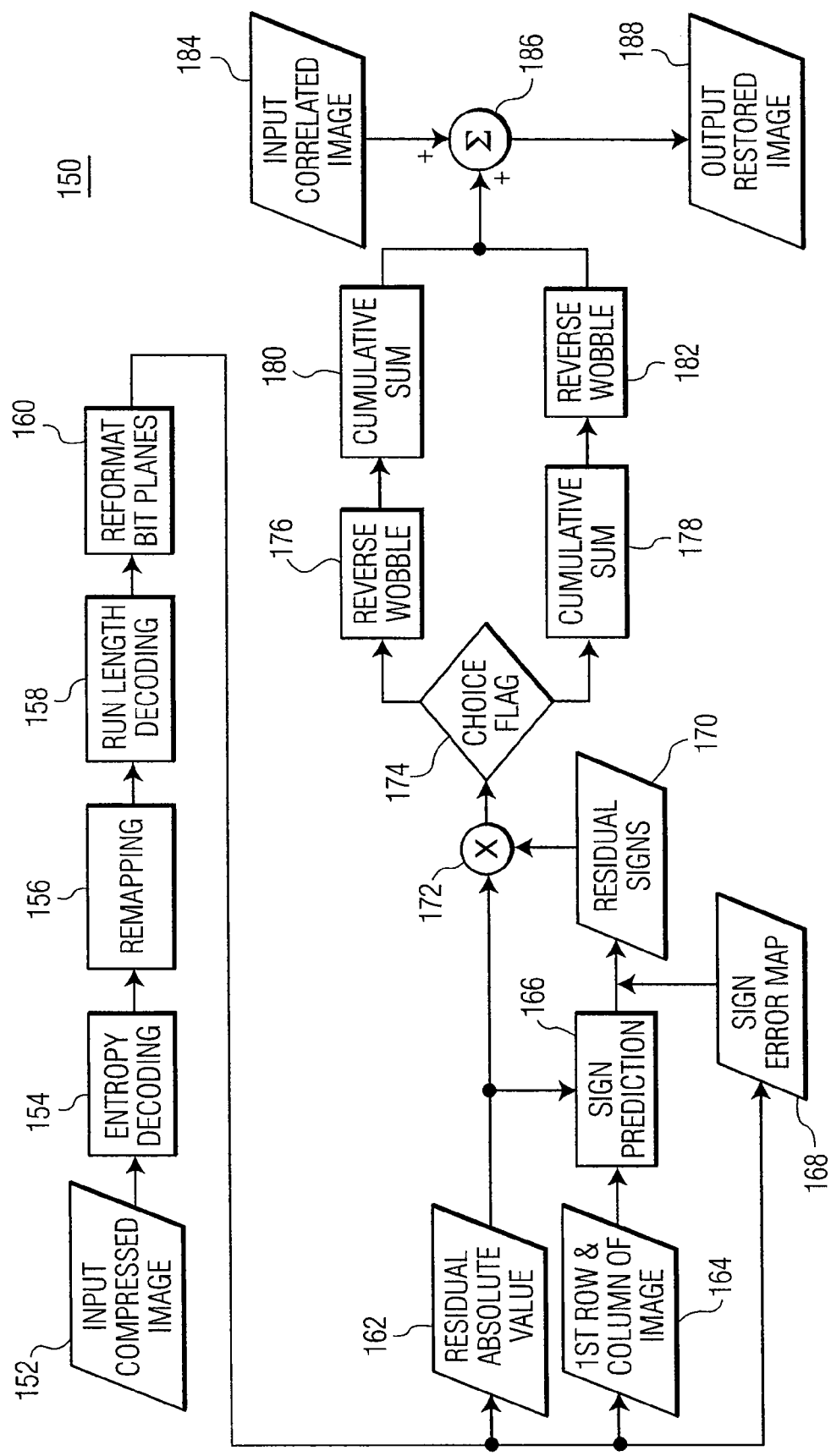
FIG. 9 is a flow diagram of a method for lossless image data decompression that is used on the compressed output image formed in the method shown in FIG. 1, in accordance with another embodiment of the present invention.
Figure 10:
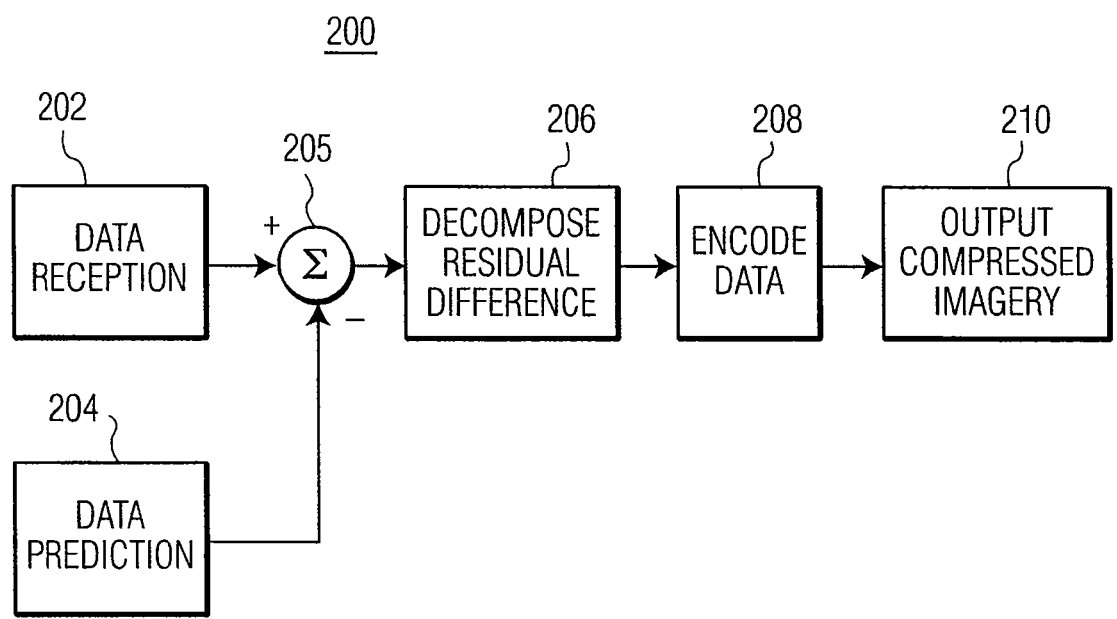
FIG. 10 is a conventional flow diagram of a compression method.

Referring now to FIG. 9, a method of image reconstruction, generally designated as 150, is shown in accordance with an embodiment of the invention.

The image reconstruction method reverses the operations described with respect to FIG. 1. The encoded or compressed data is separated from header information and uncompressed by a decoder. This produces the bit planes of the original residual image. The residual image is reconstructed by scaling each bit plane by $2^{n-1}$ (n is the number of the bit planes) and adding them together. The method then computes the cumulative sum of the residual in the scan direction. If spectral prediction is used, a predictor image is added. This reconstructs the original image with no error.

More specifically, FIG. 9 shows an exemplary method for image reconstruction, generally designated as 150. As shown, the compressed image (formed in the method of FIG. 1) is received in step 152. Step 154 provides entropy decoding of the compressed image. The entropy decoding is a reverse procedure of the entropy coding performed by step 38 of the method, shown in FIG. 1. Step 156 remaps the bit stream formed by the entropy decoding. Step 156 is the reverse procedure of step 36, shown in FIG. 1. Step 158 decodes the quasi-RLE coded by step 34 of FIG. 1. Step 160 reformats the separated bit planes into a residual image including residual absolute values (shown in step 162) and a sign error map associated with the residual absolute values (shown in step 168).

Step 166 then uses the sign reconstruction algorithm of FIG. 4 to form the signs of the residual image. Step 170 refers to the sign error map and corrects erroneously reconstructed Although illustrated and described herein with reference to certain specific embodiments, the present invention is nevertheless not intended to be limited to the details shown. Rather, various modifications may be made in the details within the scope and range of equivalents of the claims and without departing from the spirit of the invention. For example, the embodiment illustrated in FIG. 1 provides compression of 3-dimensional (two spatial dimensions and one spectral dimension) binary imagery. The present invention, of course, is applicable to compression of any type of digital data stream, including but not limited to one-, two- and N-dimensional data sets in which the dimensions may represent time, space, wavelength, polarization, phase, or any other channelization/characterization contemplated for data. The data in the different dimensions may or may not be correlated.

While the exemplary embodiment used wavelength channels as predictors, any correlated channelization (such as those listed above) may be exploited as a predictor. The present invention is not limited to binary data representations but may also apply to tertiary or any other data representation. In addition, the bit-planes (a two-dimensional construct) may also be extended to hyper-planes (constructs of 3 or more dimensions).

The present invention has applications in all areas in which compression is used, including but not limited to data storage, transmission, and archiving of music, video, digital records, medical images, and fax machine data. In addition, this invention is particularly suited to applications for which many compression algorithms are not suited. It is suited for parallel, as well as serial data architectures, including but not limited to distributed storage, low-probability of intercept transmissions, and fault-tolerant dispersed data systems. Examples include fly-by-wire aircraft control systems, covert communication systems, RAID array data storage systems, and censor/hacker resistant World Wide Web publishing systems.

What is claimed is:

1. A method of lossless image data compression comprising the steps of:
    (a) receiving a matrix of data values, each received data value represented as an n-bit binary number, each n-bit having a significance level;
    (b) forming a residual matrix of data values from the received matrix of data values, each residual data value represented as an n-bit binary number, each n-bit having a significance level;
    (c) forming n bitplanes or less bitplanes of bits from the residual matrix of data values, each bitplane having a different bit significance level;
    (d) predicting a polarity for each residual data value;
    (e) comparing the predicted polarities of step (d) with polarities of the residual matrix of data values;
    (f) determining polarities that are incorrectly predicted, based on the comparison in step (e);
    (g) listing the incorrectly predicted polarities in a table; and
    (h) encoding (1) each of the bitplanes formed in step (c) and (2) the table of incorrectly predicted polarities to form a compressed image.

2. The method of claim 1 wherein
    step (a) of receiving a matrix of data values includes receiving a matrix of pixel values, each pixel value represented as the n-bit binary number.

3. The method of claim 1 wherein
    step (c) includes forming the bitplanes of bits directly from the residual matrix of data values.

4. The method of claim 1 wherein
    step (h) of encoding includes run length encoding of the bitplanes and the table of incorrectly predicted polarities to form sample values.

5. The method of claim 4 wherein
    step (h) includes remapping the sample values into a monotonically decreasing histogram of sample values.

6. The method of claim 5 wherein
    step (h) includes entropy coding of the monotonically decreasing histogram of sample values.

7. The method of claim 1 wherein
    step (a) includes receiving temporally adjacent data values; and
    step (b) includes differencing the temporally adjacent data values to form the residual matrix of data values.

8. The method of claim 1 wherein
    step (a) includes receiving the matrix of data values as a first sequence of data values, and reformatting the first sequence into a second sequence of data values; and
    step (b) includes forming the residual matrix of data values using the second sequence.

9. The method of claim 1 including the step of:
    transmitting the encoded bitplanes and the encoded table of incorrectly predicted polarities to a receiver.

10. The method of claim 1 wherein
    step (d) includes
    (i) forming sum and difference values between a data value of the residual matrix and an adjacent data value of the received matrix;
    (ii) differencing the sum and difference values from spatially adjacent multiple data values of the received matrix to form multiple positive and negative data values;
    (iii) placing the multiple positive and negative data values into different categories based on their respective absolute values;
    (iv) determining a polarity of the smallest absolute value of the positive and negative data values placed into each of the different categories; and
    (v) predicting a polarity of a data value in the residual matrix based on each of the polarities determined in step (iv).

11. A method of lossless image data compression comprising the steps of:
    (a) receiving an image;
    (b) forming a residual image by differencing adjacent samples of the received image;
    (c) forming multiple bitplanes directly from the residual image;
    (d) predicting polarities of data values of the residual image;
    (e) determining incorrectly predicted polarities and storing the incorrectly predicted polarities in a table; and
    (f) encoding each of the bitplanes and the incorrectly predicted polarities in the table to form a compressed image.

12. The method of claim 11 wherein
    after step (f), the method performs the step of:
    (g) transmitting both the encoded bitplanes and the encoded incorrectly predicted polarities of the table.

13. The method of claim 11 wherein
    step (f) includes run length encoding of the bitplanes and the incorrectly predicted polarities of the table to form a stream of data bits.

14. The method of claim 13 wherein
    step (f) includes remapping the stream of data bits into a monotonically decreasing histogram of data values, and entropy coding the monotonically decreasing histogram of data values using a Rice entropy coder.

15. The method of claim 11 wherein
    step (a) includes wobbling the received image to form a wobbled image.

16. The method of claim 11 wherein
    the received image is an N×M matrix and the residual image is an (N−1)×(M−1) matrix, and
    step (b) includes appending the residual image to the first row and first column of the received image.

17. The method of claim 11 wherein
    step (d) includes
    (i) forming sum and difference values between a data value of the residual image and an adjacent data value of the received image;
    (ii) differencing the sum and difference values from spatially adjacent multiple data values of the received image to form multiple positive and negative data values;
    (iii) placing the multiple positive and negative data values into different categories based on their respective absolute values;
    (iv) determining a polarity of the smallest absolute value of the positive and negative data values placed into each of the different categories; and
    (v) predicting a polarity of a data value of the residual image based on each of the polarities determined in step (iv).

18. A method of predicting polarities of data values of a residual image formed by differencing adjacent samples of a received image, the method comprising the steps of:
- (a) forming sum and difference values between a data value of the residual image and a data value of an adjacent sample of the received image;
- (b) differencing the sum and difference values from spatially adjacent multiple data values of the received image to form multiple positive and negative data values;
- (c) placing the multiple positive and negative data values into different categories based on their respective absolute values;
- (d) determining a polarity of the smallest absolute value of the positive and negative data values placed into each of the different categories;
- (e) predicting a polarity of a data value of the residual image based on each of the polarities determined in step (d); and
- (e') storing the predicted polarity of the data value of the residual image in memory.

19. The method of claim 18 wherein
step (c) includes placing one sum and one difference data values into each of the different categories, and
step (d) includes selecting the polarity of the smallest absolute value between the data values in each of the different categories.

20. The method of claim 18 wherein
the different categories include a minimum magnitude category, a maximum magnitude category and an intermediate magnitude category, and
step (c) includes placing one sum and one difference data values into each of the minimum magnitude, maximum magnitude and intermediate magnitude categories.

21. The method of claim 18 wherein
step (d) includes selecting the polarity of the smallest absolute value between one sum and one difference data values in each of the different categories, and
step (e) includes selecting a majority polarity among the selected polarities of the smallest absolute values in the different categories as the predicted polarity.

22. The method of claim 18 including the steps of:
- (f) comparing the predicted polarity of the residual image with a corresponding actual polarity of the residual image; and
- (g) listing the actual polarity in a table, if the predicted polarity is incorrect.

23. A method of lossless image data decompression comprising the steps of:
- (a) receiving a compressed image including multiple bitplanes of bits;
- (b) reformatting the multiple bitplanes of bits to form a bit stream of absolute values of a residual image and a sign error map for the absolute values;
- (c) predicting sign bits for the absolute values of the residual image;
- (d) comparing the predicted sign bits of the residual image with corresponding sign bits of the sign error map;
- (e) modifying the predicted sign bits based on the comparison in step (d) to form residual signs for the residual image; and
- (f) forming a restored image based on the residual image and the residual signs.

24. The method of claim 23 including the step of:
after receiving the compressed image, run length decoding the received compressed image.

25. The method of claim 24 including the step of:
prior to run length decoding, entropy decoding the compressed image.

26. The method of claim 25 including the step of:
after entropy decoding and prior to run length decoding, remapping the compressed image.

27. The method of claim 23 including the step of:
after forming the residual image, reformatting a sequence of bits of the residual image into another sequence of bits to form a non-wobbled residual image.

28. A method of compressing an image comprising the steps of:
- (a) receiving an image;
- (b) differencing adjacent pixels to form a residual image having bit data values including positive and negative polarities;
- (c) forming absolute values for the bit data values of the residual image,
- (d) predicting polarities of each of the absolute values formed in step (c);
- (e) comparing the predicted polarities with polarities of bit data values of the residual image;
- (f) storing incorrectly predicted polarities in a table, based on the comparison in step (e); and
- (g) compressing the absolute values formed in step (c) and the table stored in step (f).

29. The method of claim 28 wherein
step (g) includes run length encoding the absolute values and the table to form an encoded data stream.

30. The method of claim 29 wherein
step (g) further includes entropy encoding of the encoded data stream.

* * * * *